United States Patent [19]

Robishaw

[11] Patent Number: 4,687,379
[45] Date of Patent: Aug. 18, 1987

[54] METHOD AND APPARATUS FOR CONSTRUCTING ELEVATED STRUCTURES

[76] Inventor: Alces P. Robishaw, 9333 Memorial #210, Houston, Tex. 77024

[21] Appl. No.: 903,295

[22] Filed: Feb. 9, 1986

Related U.S. Application Data

[62] Division of Ser. No. 704,500, Feb. 22, 1985, Pat. No. 4,647,257.

[51] Int. Cl.$^4$ ............................................. E02B 17/00
[52] U.S. Cl. ..................................... 405/195; 52/726; 403/337; 403/348; 405/204
[58] Field of Search ............... 405/228, 195, 118, 119, 405/120; 52/127.12, 826; 403/337, 348, 408.1

[56] References Cited

U.S. PATENT DOCUMENTS

| | | | |
|---|---|---|---|
| 1,771,167 | 7/1930 | Dolan | 403/408.1 X |
| 2,808,913 | 10/1957 | Frieder et al. | 52/726 X |
| 3,131,542 | 5/1964 | Koch | 405/219 |
| 3,448,511 | 6/1969 | Suter | 405/228 X |
| 3,480,311 | 11/1969 | Lanham | 403/408.1 |
| 3,787,134 | 1/1974 | Burr | 403/408.1 |
| 4,021,991 | 5/1977 | Hotz | 403/408.1 X |
| 4,394,101 | 7/1983 | Richer | 403/348 X |
| 4,490,065 | 12/1984 | Ullrich et al. | 403/408.1 X |

FOREIGN PATENT DOCUMENTS

| | | | |
|---|---|---|---|
| 0253751 | 4/1967 | Austria | 52/726 |
| 0864145 | 1/1953 | Fed. Rep. of Germany | 52/726 |

Primary Examiner—Dennis L. Taylor
Attorney, Agent, or Firm—Browning, Bushman, Zamecki & Anderson

[57] ABSTRACT

A method and apparatus for forming elevated structures. A first construction component is emplaced at a construction site, supported by an underlying earth formation. A second construction component is locked in cantilevered relation to the first such component. A support is extended downwardly from the second component, distal the first component, into load bearing engagement with the earth formation, whereafter the second component is interlocked to the support. The ends of the longitudinal components have improved locks in which a connector of the male lock can be passed through a receiving bore in a female lock only if oriented in a particular angular position, whereafter, if rotated to a different angular position, it cannot be withdrawn from the receiving bore. Similar locks are provided for interconnecting such longitudinal components in side-by-side relation via transom components. At least some of the ends of the longitudinal components have guides for the supports, with an improved manner of interassociating such guides with the remainders of the components.

23 Claims, 26 Drawing Figures

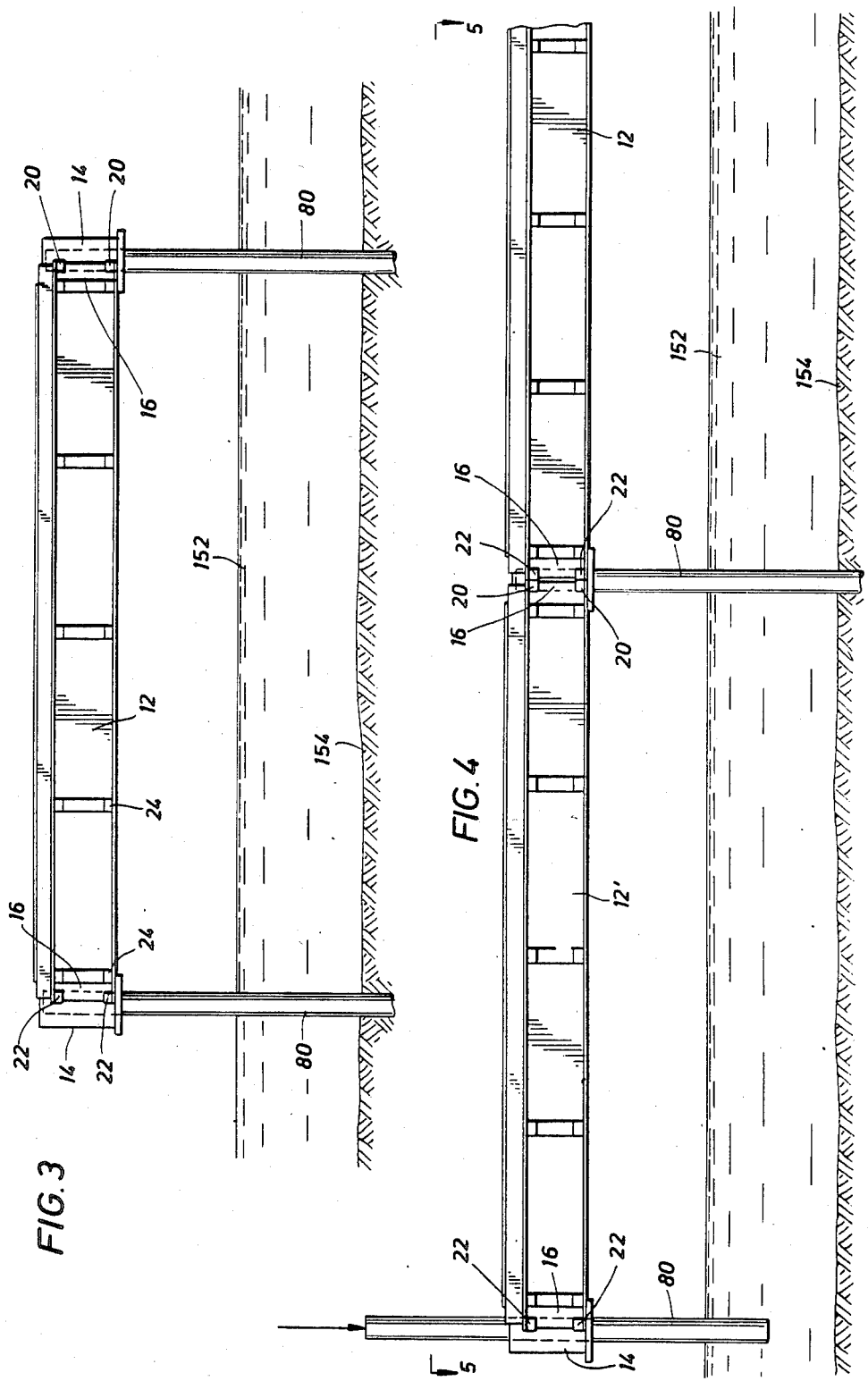

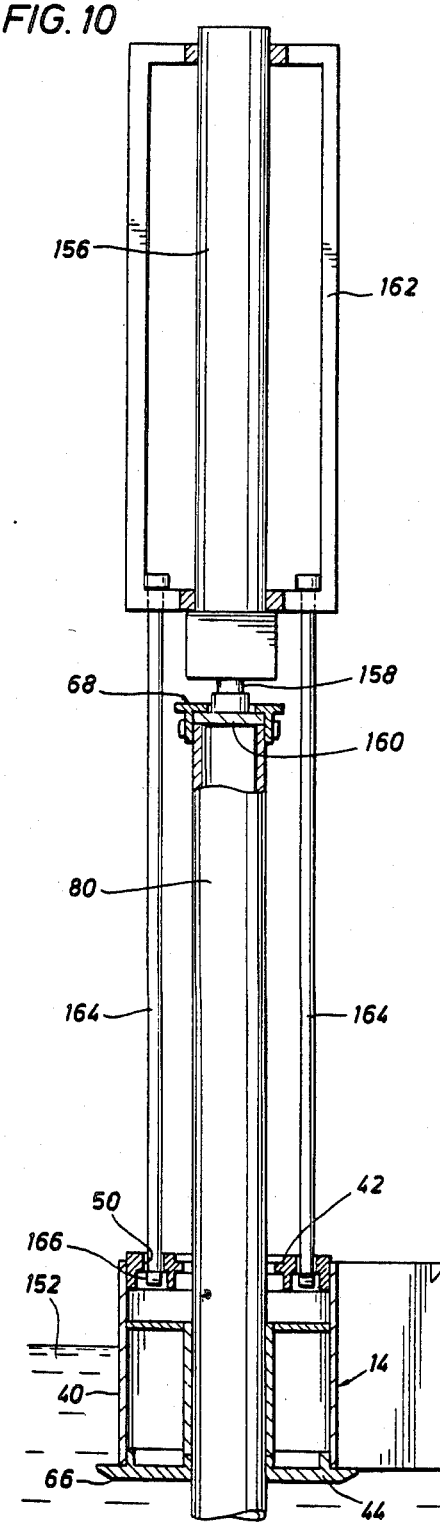
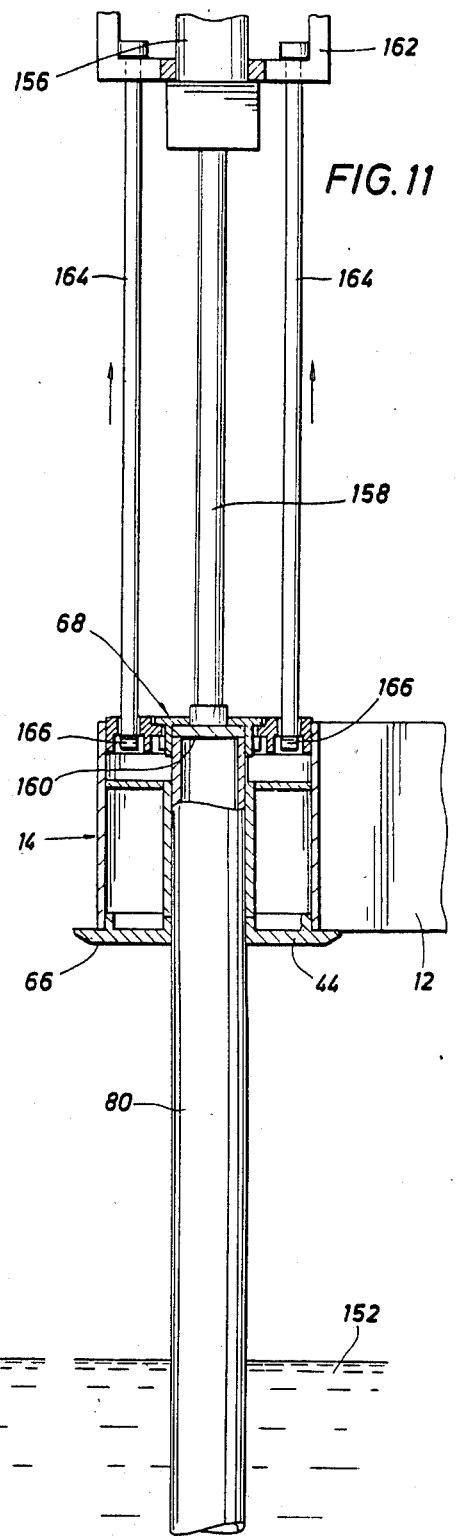
FIG. 10
FIG. 11

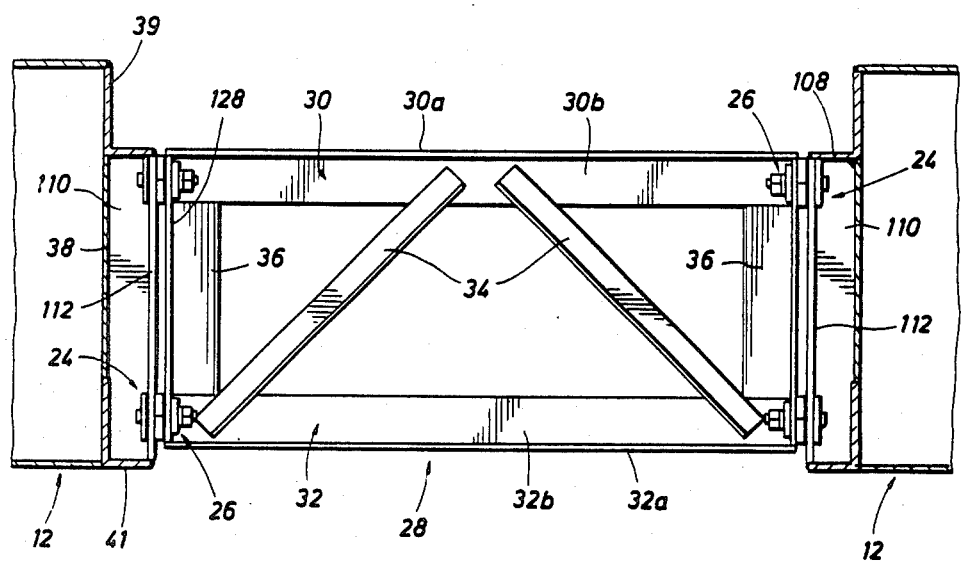
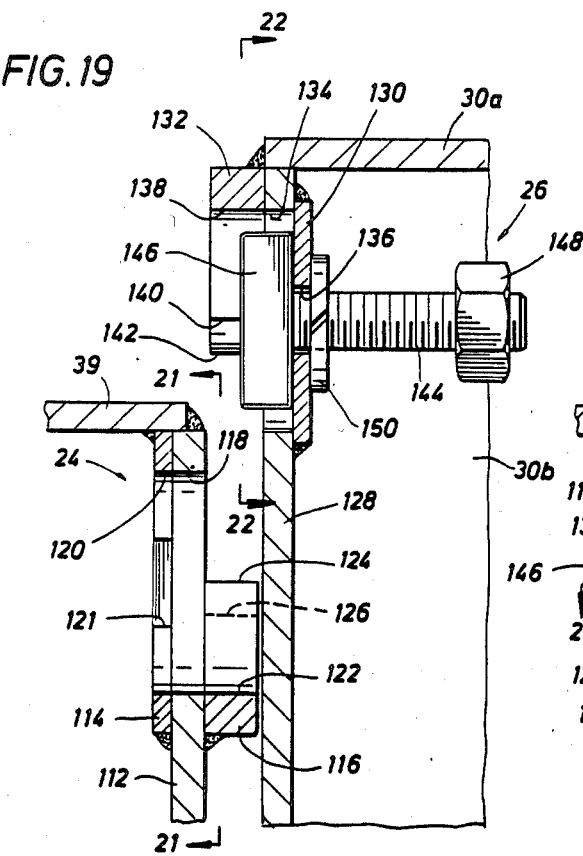
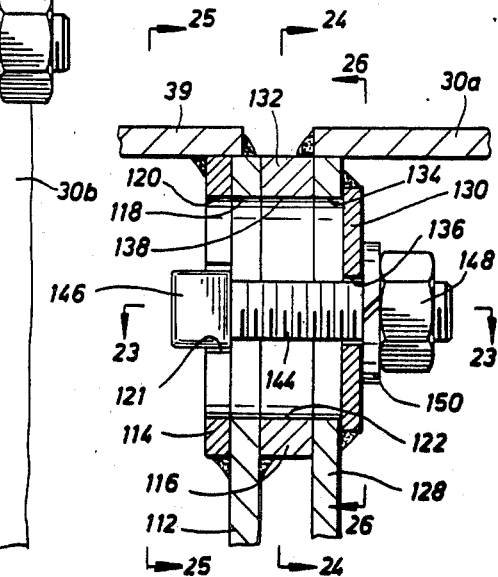

METHOD AND APPARATUS FOR CONSTRUCTING ELEVATED STRUCTURES

This is a division of application Ser. No. 704,500, filed Feb. 22, 1985, Now U.S. Pat. No. 4,647,257.

BACKGROUND OF THE INVENTION

The present invention pertains to the construction of elevated structures such as bridges, piers or docks, offshore structures, and elevated platforms of various types. The invention encompasses both methods and apparatus for such construction. These methods and apparatus are useful when it is necessary to build such structures in difficult environments, e.g. over bodies of water. However, they are likewise suitable for many other construction projects, such as the building of overpasses and the like in highway construction.

In the past, it has been known to construct elevated structures such as platforms in relatively shallow bodies of water utilizing buoyant members of a type used to form barges and the like. In some cases, several such buoyant members would be connected together by lock assemblies carried thereon to form a platform. Pilings could be driven through suitable guides on the platform, whereafter the platform was jacked up on these pilings and ultimately locked to the pilings for support thereby.

This scheme still remains desirable for many applications. However, it does make use of buoyant members particularly designed for use in forming barge-like structures, which may not be necessary for some projects. Furthermore, it utilizes a locking system primarily designed for floating structures and which likewise may not be necessary for other kinds of structures. Thus, there has been room for improvement in this scheme, depending on the type of structure to be built.

SUMMARY OF THE INVENTION

The present invention comprises a method of forming elevated structures, apparatus in the form of a system for constructing such structures, and individual elements of such system, including construction components and locks for locking the components to one another.

In accord with the method of the present invention, at least one construction component is emplaced at a construction site supported by an underlying earth formation. Such support may be direct, as where the component rests directly on the ground, or indirect, e.g. by means of suitable pilings or the like. In some instances, one end of the component may be supported directly and the other indirectly.

In any event, the method includes the positioning of a second construction component adjacent the first component. The second component is then supported in cantilever fashion on the first component by locking said second component to said first component. Support means is then extended downwardly from the second component into load bearing engagement with the earth formation. Finally, the second component is interlocked to the support means for support thereby.

In a preferred embodiment of the method of the present invention, the two components are longitudinal components, and the first is so emplaced with both ends thereof supported by the earth formation. The second component is positioned with one end thereof adjacent one end of the first component, whereafter the adjacent ends are locked together to effect the aforementioned temporary cantilevering of the second component from the first component. When the support means are extended from the second component, they are so extended distal that end which is locked to the first component, so that, after the second component is interlocked, to the support means, it is then fully supported, i.e. supported at both ends, on the earth formation, whereafter it can be used as a base for further building out of a third component.

Even more specifically, in the preferred embodiment, the longitudinal construction components comprise girders, and at least the one end of the first longitudinal component to which the second longitudinal component is connected is elevated above the earth formation. A plurality of such first longitudinal components are so emplaced on the construction site in side-by-side relation and are connected together, preferably by transom construction components which lie perpendicular to the longitudinal components and space them apart to form a first span. A plurality of second longitudinal components are locked endwise to respective longitudinal components of the first span, then laterally connected by transom components to form a second span, and finally supported by support means in the aforementioned manner. Preferably, the support means comprise pilings extending generally through the longitudinal components and driven into their load bearing engagement with the earth formation. Additional spans can be incrementally built on in like manner to form a structure of any desired length.

The construction system of the present invention comprises a plurality of longitudinal construction components each comprising a girder having primary locking means on its ends for locking the girders together in end-to-end relation. The primary locking means include both male and female locks. In addition, the girders preferably also have a plurality of auxiliary locking means along their lateral sides. Cooperative auxiliary locking means are provided on the ends of the transom components which are used to connect the girders of each span side by side.

Each end of each girder has a pair of arms extending longitudinally outwardly from opposite lateral sides thereof to define a channel there between. The construction component further comprises guide means disposed in at least one of the channels of each girder but protruding endwise therefrom. Each guide means is rigidly affixed to the adjacent end of the respective girder and has a throughway for receipt of a support member such as a piling. The throughway is disposed transverse to the end-to-end length of the girder as well as to the lateral side-to-side width of the girder. Interlock means are associated with each guide means. When the throughway is generally vertically oriented and the support member is in the bore, the interlock means is interengageable between the guide means and the support member to allow the guide means, and thus the attached girder, to be supported on the support member.

The guide means preferably also comprises a flange underlying the attached girder end and extending at least partially along the portion of the guide means protruding from the girder channel. Thus, this flange can help to locate and support a girder of the next span as it is locked in cantilever relation to the first girder.

A locking system according to the invention, whether primary or auxiliary, comprises an elongate connector member having a shank and a head rigidly carried on one end of the shank. The head has first and second transverse dimensions measured in perpendicular directions, and the first transverse dimension is substantially greater than the second. The first transverse dimension is also substantially greater than the transverse dimension of the shank measured parallel to the first transverse dimension.

The locking system further comprises a carrier member having a front face which, in use, faces outwardly endwise of the attached girder, and a rear face at the opposite end of the member. A carrier bore extends through the carrier member from front to rear and receives the connector member for longitudinal reciprocation.

The system includes a receiving member having similar front and rear faces and a receiving bore therethrough. The receiving bore has first and second transverse dimensions measured in perpendicular directions. The first transverse dimension of the receiving bore is greater than the first transverse dimension of the connector head, while the second transverse dimension of the receiving bore is greater than the second transverse dimension of the connector head but less than its first transverse dimension.

Thus, the receiving bore will permit passage of the head of the connector member therethrough when the bores of the carrier and receiving members are coaxially aligned and the first transverse dimension of the head is arranged parallel to the first transverse dimension of the receiving bore but will prevent such passage if the connector is rotated 90° so that the first transverse dimension of the head lies parallel to the second transverse dimension of the receiving bore.

Finally, the locking sub-system includes securing means selectively interengageable between the connector member and the carrier member to limit forward movement of the connector member with respect to the carrier member.

The connector member, carrier member and securing means make up a male lock, while the receiving member forms the female lock. In preferred embodiments, the rear face of the receiving member has recess means extending longitudinally thereinto communicating with and extending radially outwardly from the receiving bore parallel to its second transverse dimension. The recess means is adapted to at least partially closely receive the head of the connector member when the first transverse dimension of the head is arranged parallel to the second transverse dimension of the receiving bore.

In use, a construction component having at least one lock will be in place and supported by the aforementioned support means when another construction component is positioned adjacent thereto with locks of opposite gender on the respective construction components facing each other and brought into abutment. Turning the head of the connector member so that its first or largest transverse dimension lies parallel to the first or largest transverse dimension of the receiving bore of the female lock, the connector member can be advanced through said receiving bore. Then, the connector member is rotated about its own axis 90°, so that its head can be placed in the recess means at the rear of the receiving member. This helps to properly position the connector member while the securing means are interengaged between the connector member and the carrier member. By preventing further forward movement of the connector member, the securing means holds the head of the connector member tight against the rear of the receiving member whereby the two locks, and thus the attached construction components, are locked together. The recess means ensure that the connector head will not work its way around to a position in which it could slip through the receiving bore.

The auxiliary locking means are generally similar to the primary locking means in structure and principle of operation. However, in preferred embodiments, the primary locking means are designed so that the connector member cooperates with the carrier and receiving members to take shear loads in at least one transverse direction. In the auxiliary locking system, by way of contrast, special shear bearing formations are provided on the carrier members and receiving members for direct cooperation with each other.

Accordingly, with the primary locking system, even if there are two locks disposed one above the other on a longitudinal construction component, that component can be emplaced in and removed from a position in which it can be locked to another such component by strictly vertical movements. This is particularly advantageous in disassembly since the pilings pass vertically through the longitudinal components and would interfere with lateral movements.

The simplicity of the locking means, both in form and operation, allows them to comprise individual components which are relatively strong. Yet, because of the aforementioned simplicity, and in particular, the fact that the number of components in each lock is relatively few, the locks as a whole are not unduly heavy, bulky or oversized with respect to the construction components on which they are carried. Thus, they are well suited for use in the construction of bridges and other elevated structures wherein the locks must bear large loads. Furthermore, the simplicity of operation of the locking means makes them particularly well suited for use in construction projects in the context of the remote locations and other difficult circumstances under which the construction system and method may be used.

It is an important object of the present invention to provide an improved method of forming an elevated structure.

Another object of the present invention is to provide an improved construction system.

A further object of the invention is to provide improved construction components for use in such system and method.

Yet another object of the present invention is to provide an improved locking system for locking together construction components.

Still other objects, features and advantages of the present invention will be made apparent by the following detailed description, the drawings and the claims.

BRIEF DESCRIPTION OF THE DRAWINGS

FIG. 3 is a view similar to that of FIG. 2 showing the structure elevated to its intended height.

FIG. 4 is a side elevational view showing a second span of the structure being built out from the first span.

FIG. 10 is a longitudinal view, partly in section and partly in elevation, of a jack assembly which may be associated with one of the guide means and its support member for elevating the first span to its intended height, and showing the apparatus prior to elevation.

FIG. 11 is a view similar to that of FIG. 10 showing the apparatus after elevation.

FIG. 18 is an elevational view of one of the transom components interconnecting adjacent girders and showing the lateral portions of said girders in cross section.

FIG. 19 is an enlarged cross-sectional view taken axially through male and female locks of the auxiliary locking system, and showing the locks prior to engagement.

FIG. 20 is a view similar to that of FIG. 19 showing the auxiliary locks after engagement.

DETAILED DESCRIPTION OF THE PREFERRED EMBODIMENT

Figure 1:
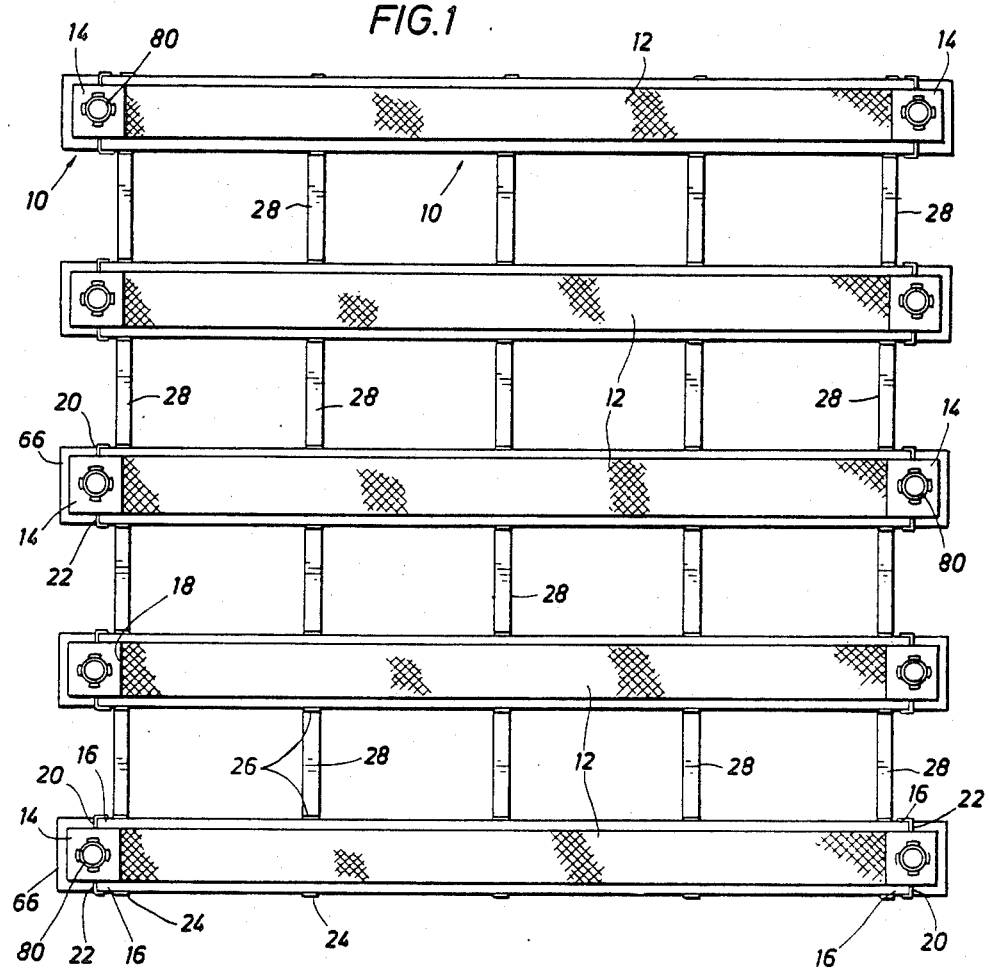
FIG. 1 is a top plan view of a first span of a structure being formed without decking and prior to elevation to its intended height.

Referring now to the drawing, there is shown a preferred embodiment of the present invention illustrated in the context of an exemplary construction project involving the building of an elevated platform in a shallow body of water. Various aspects of the invention may also be used in connection with many other types of projects, and in other environments, in some cases involving modifications of the exemplary embodiment shown. As used herein, "elevated structure" will mean any structure of which at least part is spaced above the underlying earth formation as by pilings or other supports. Non-exclusive examples include: bridges, overpasses, offshore platforms and piers.

Figure 2:
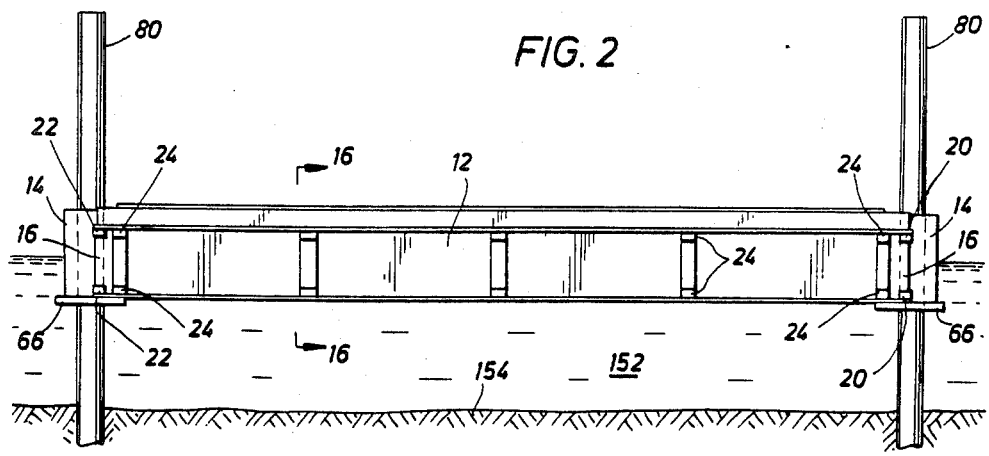
FIG. 2 is a side elevational view of the structure of FIG. 1.

Referring more particularly to FIGS. 1 and 2, there is shown a first span of the platform to be constructed. This first span comprises five longitudinal construction components 10 connected side-by-side by transom components 28. Each longitudinal component 10 comprises an elongate girder 12 and a pair of pile guide assemblies 14, each of which is affixed to a respective one of the two ends of the girder 12.

More specifically, and referring now also to FIGS. 6, 8, 9 and 12, each end of each of the girders 12 has a pair of arms 16 extending longitudinally outwardly from opposite lateral sides thereof to define a channel 18 therebetween. The respective pile guide assembly 14 is square in transverse cross section, and the channel 18 is correspondingly shaped to abut the outer sides of the pile guide assembly 14 on three sides. Arms 16 are sized to extend approximately half way across the pile guide assembly 14, so that half the pile guide assembly protrudes endwise from the girder 12.

The outer ends of arms 16 carry primary locking means. At each end of each of a girder 12, one of the two arms 16 carries a pair of vertically spaced primary female locks 20, and the other arm carries a pair of vertically spaced male locks 22 so that there are a total of four locks on each end of the girder 12.

Each girder 12 also has a plurality of auxiliary female locks 24 mounted on its lateral sides. Transom construction components 28 have, on their ends, auxiliary male locks 26 designed for cooperation with auxiliary female locks 24.

As best shown in FIG. 18, each of the transom members 28 is generally in the form of a truss including upper and lower horizontal members 30 and 32, respectively, diagonal bracing members 34, and vertical end members 36. The forms of these various members will be described more fully below. The members are rigidly affixed to one another in any suitable manner, as well known in the art, e.g. by welding. The girders 12 may take various forms, as will be apparent to one of skill in the art, and in particular may be provided with closure skins 38 of sheet metal so that they may be made buoyant. Girders 12 would typically also include suitable internal struts and/or other reinforcing means, as would be apparent to one of skill in the art.

Referring to FIGS. 6-9, one of the pile guide assemblies 14 is illustrated in greater detail. The assembly 14 includes a housing or casing comprising side walls 40 which define the aforementioned square transverse cross-sectional configuration. Upper and lower end walls 42 and 44, respectively, are rigidly affixed to side walls 40 in a suitable manner, e.g. by welding.

Figure 7:
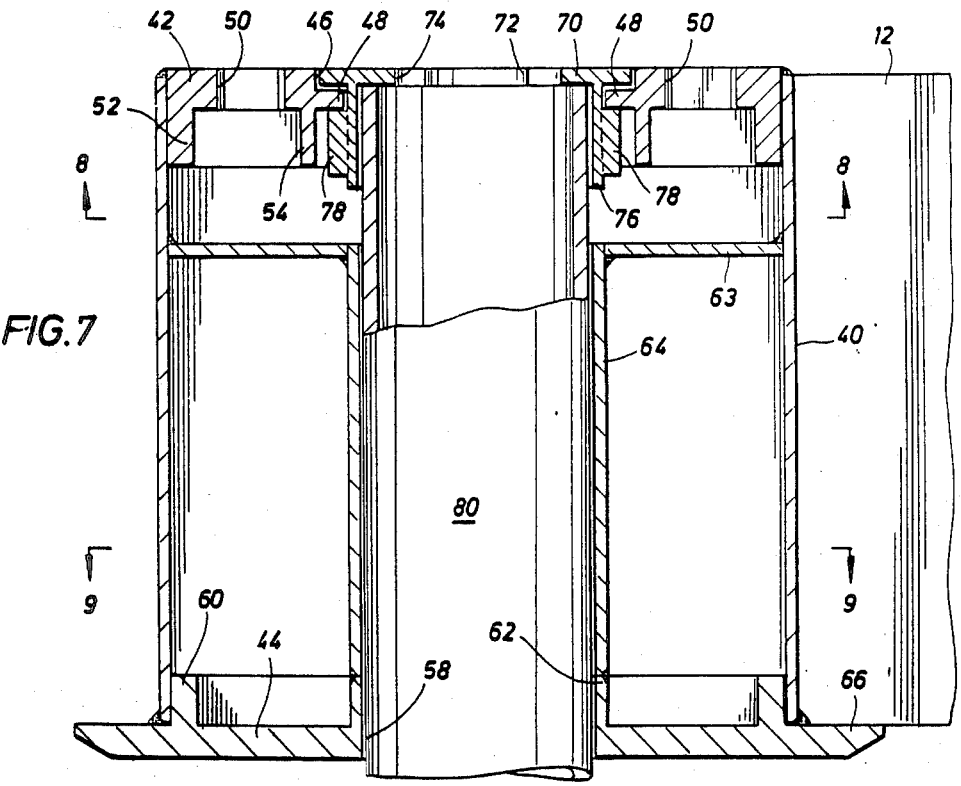
FIG. 7 is a longitudinal sectional view of the guide means taken on the line 7—7 of FIG. 6.
Figure 8:
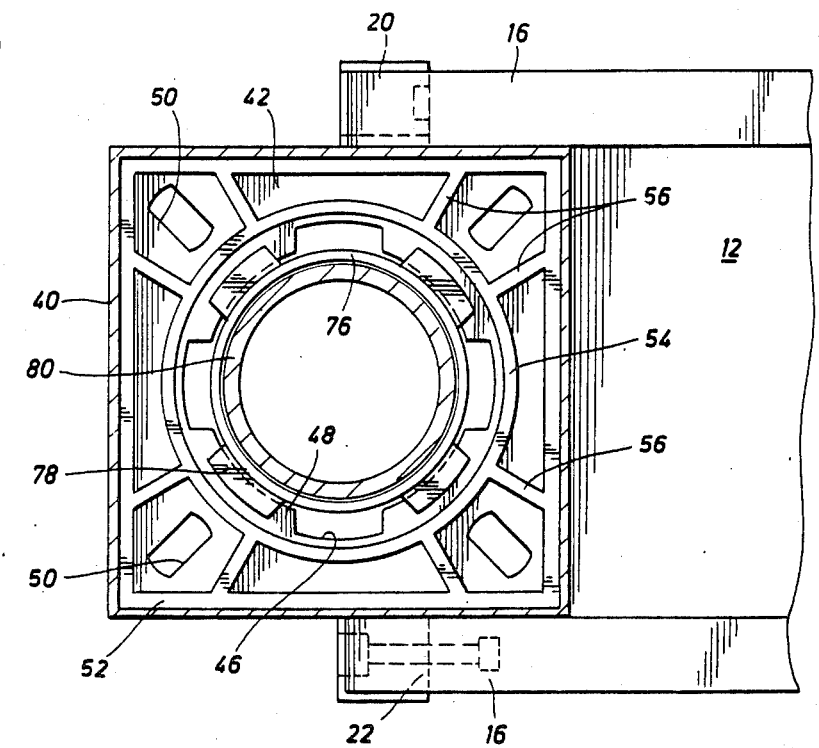
FIG. 8 is a transverse sectional view taken on the line 8—8 of FIG. 7.
Figure 9:
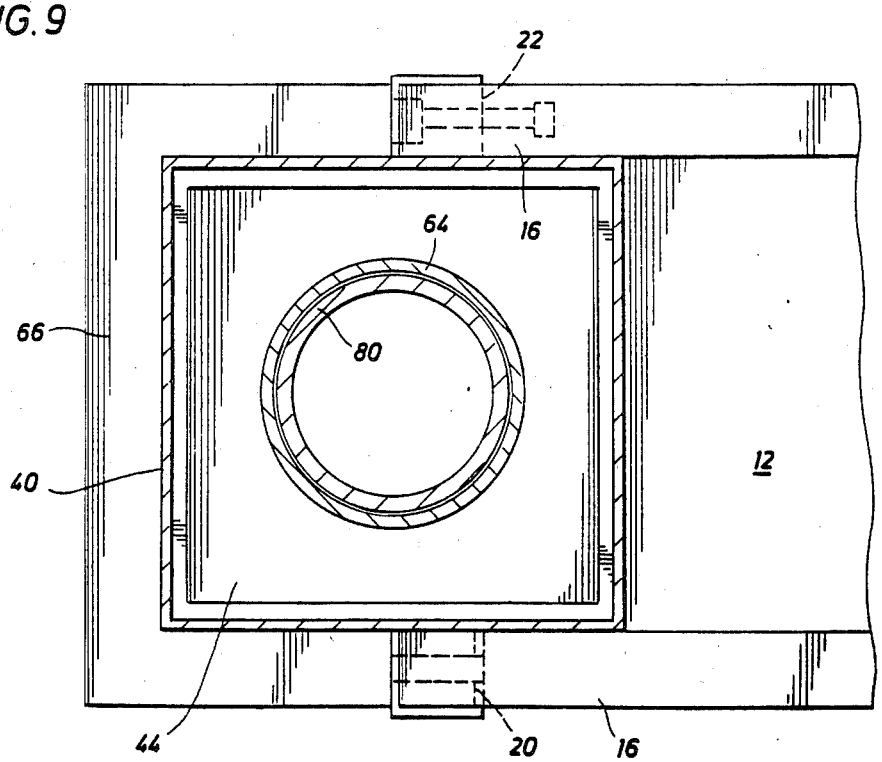
FIG. 9 is a transverse sectional view taken on the line 9—9 of FIG. 7.

Upper wall 42 has a central opening 46. Slightly below the upper extremity of upper wall 42, and integral therewith, are a plurality of lips 48 circumferentially spaced from one another about opening 46 and extending radially thereinto. Upper wall 42 is also provided with slots 50 located outwardly of central opening 46 near the four corners of upper wall 42. As shown in FIGS. 7 and 8, upper wall 42 is reinforced along its underside by a rectangular skirt 52 extending downwardly adjacent the outer extremity of wall 42, a cylindrical skirt 54 extending downwardly adjacent and partially defining central opening 46, and a plurality of gussets 56 interconnecting skirts 52 and 54.

Lower wall 44 has a central opening 58 in register with opening 46 of upper wall 42. Lower wall 44 is reinforced by a rectangular skirt 60 extending upwardly just inside lateral walls 40. A short cylindrical skirt or lip 62 extends upwardly adjacent opening 58, and a sleeve 64 of like inner and outer diameters is affixed to and extends upwardly from lip 58 to a point spaced somewhat below upper wall 42 and its reinforcing structures. The upper end of sleeve 64 is braced against side walls 40 by a horizontal plate 63. Thus, a central throughway is defined in assembly 14 by opening 58, the interior of sleeve 64, the hollow gap between sleeve 64 and wall 42, and opening 46. A flange 66 integral with lower wall 44 extends laterally outwardly beyond lateral walls 40 so as to form a square rim extending about the entire periphery of the pile guide assembly 14 at its lower extremity. Flange 66 underlies and abuts the end of the attached girder 12 and its arms 16.

An interlock member 68 is associated with upper wall 42 of the pile guide assembly 14. Interlock member 68 includes an upper horizontal plate 70 having a central bore 72 with slots 74 extending radially outwardly therefrom. Member 68 further comprises a cylindrical skirt 76 extending downwardly from plate 72 and spaced inwardly from the outer extremity of plate 70 so that it can pass through lips 48. A plurality of lugs 78 formed integrally with skirt 76 extend radially outwardly therefrom, spaced circumferentially from one another. Lugs 78 are sized so that, if aligned with the portions of opening 46 between lips 48, skirt 76 can be lowered through opening 46 until the outer edge of plate 70 rests on lips 48. Then, if member 68 is rotated (by engaging a tool with slots 74) so that lugs 78 underly lips 48, member 68 cannot be withdrawn from bore 48, and conversely, if member 68 is suitably supported, the entire assembly 14 may in turn be supported thereon by virtue of the interengagement of lips 48 and lugs 78.

As will be explained more fully hereinafter, such support of member 68 is provided by support means in the form of cylindrical pilings 80, each of which is associated with a respective one of the assemblies 14. For purposes of the present discussion, it is sufficient to note that skirt 76 is sized to surround piling 80, and that if piling 80 is disposed within assembly 14, plate 70 may rest on its upper end, and with lugs 78 underlying lips 48, member 68 may thus interlock assembly 14 to piling 18 for support thereby. Skirt 76 has a relatively loose fit about piling 80, to avoid jamming, while sleeve 64 and rim may have a closer fit for guiding piling 80.

Turning now to FIGS. 12–17, the primary locking means on one end of a girder 12 will be described in greater detail. The female lock 20 comprises a block-like receiving member generally in the form of a rectangular parallelepiped 82. On each lateral side of the outer girder 12, the upper and lower extremities of the outer casing are formed by angle iron members 39 and 41 respectively. Each of the members 39 and 41 has one leg generally vertically disposed welded to and forming a continuation of the skin 38. The other leg of each of members 39 and 41 is disposed lowermost thereon and extends laterally outwardly to form a flange. The receiving member 82 of the uppermost female lock is welded to the underside of the laterally twardly extending leg of upper angle iron member 39, as well as to the skin 38 therebelow. Receiving member 82 of the lowermost female lock is welded to the upper side of the laterally outwardly extending flange of lower angle iron member 41 as well as to the other leg of member 41 extending upwardly along the laterally inner side of the lower receiving member 82. To further brace the upper and lower receiving members 82, they are interconnected by a plate-like web 43, also connected to the receiving members 82 by welding.

The face 86 of each receiving member 82 which faces outwardly from the respective girder arm 16 will be considered its forward face, and the opposite face 88 will be considered its rear face. It is specifically noted that this manner of mounting the receiving blocks 82 gives them a good deal of support and bracing, while leaving their front and rear faces 86 and 88 and their laterally outer sides exposed so that the locks may be operated in the manner described hereinbelow.

Figure 13:
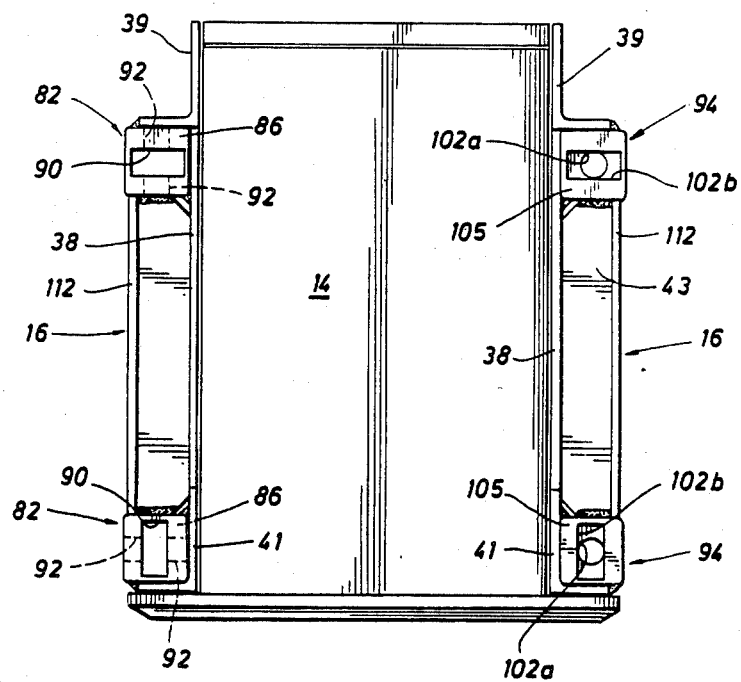
FIG. 13 is an end view of the longitudinal construction component taken on the line 13—13 of FIG. 12.
Figure 14:
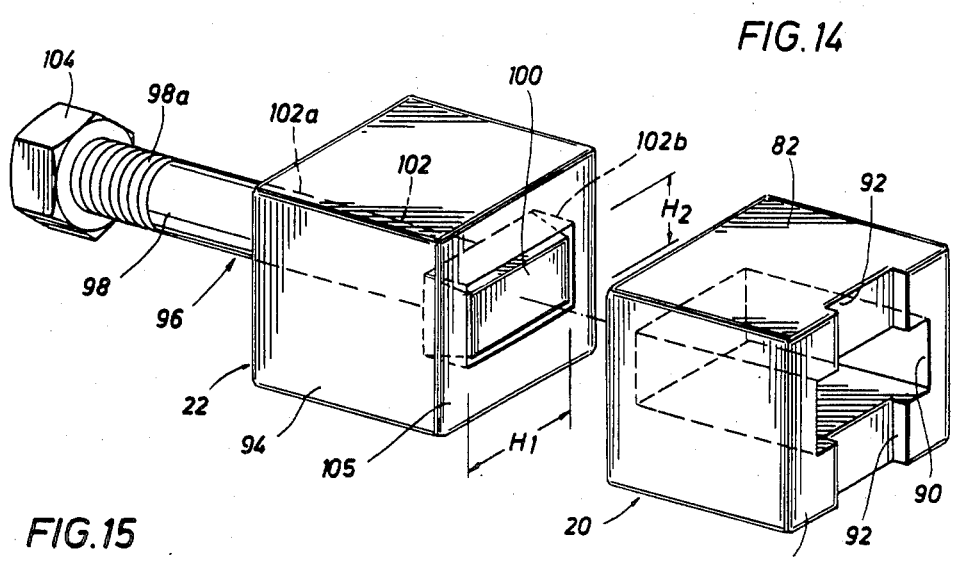
FIG. 14 is a perspective view of a primary locking system prior to locking the male and female locks together.
Figure 15:
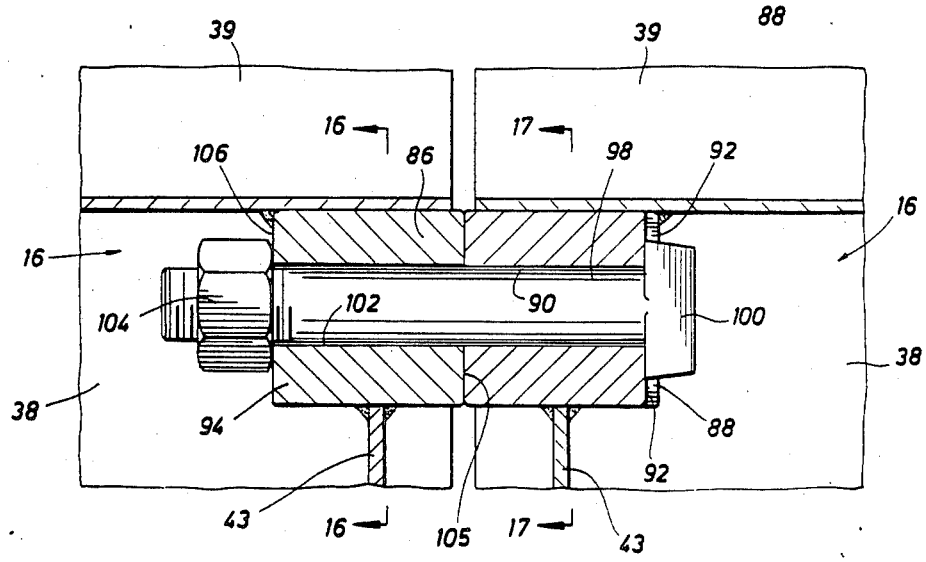
FIG. 15 is a longitudinal cross-sectional view of the apparatus of FIG. 14 with the male and female locks locked together.
Figure 16:
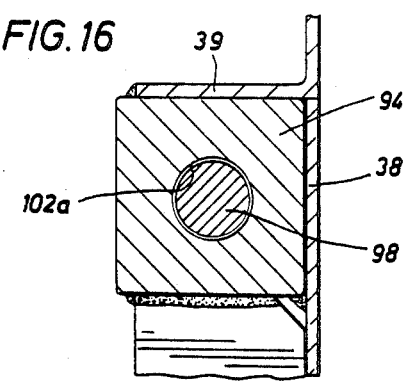
FIG. 16 is a transverse cross-sectional view taken on the line 16—16 in FIG. 15.

The upper female lock will now be more fully described in conjunction with FIGS. 14–17, and it should be understood that the lower female lock is identical, though differently oriented, as will be described more fully hereinafter. A receiving bore 90 extends through member 82 from front to rear, opening through both faces 86 and 88. Bore 90 is generally rectangular in transverse cross section, having a first transverse dimension $P_1$ (in the case of the upper lock, its horizontal width) which is substantially greater than its other transverse dimension $P_2$. A pair of recesses 92 extend longitudinally into rear face 88. Recesses 92 are located respectively above and below bore 90. They communicate with bore 90 and extend radially outwardly therefrom parallel to its second transverse dimension $P_2$, and more specifically, above and below bore 90. As shown in FIG. 13, the receiving member 82 of the lower female lock is oriented with the first or largest transverse dimension of its rectangular bore 90 oriented vertically.

Each male lock 22 comprises a block-like carrier member 94, a connector member 96, and a securing nut 104. The relationship of the carrier members 94 to the various parts of the respective girder arms 16 on which they are mounted is the same as that for the receiving members 82 of the female locks. Briefly, the carrier member 94 of the upper male lock is welded to the underside of the upper angle iron member 39 and to the skin 38 thereunder. The carrier member 94 of the lower male lock is nested in the angle of lower angle iron member 41 and welded to both legs thereof. The carrier members 94 are interconnected and braced by web 43. Again, the mounting method allows access to the locks from the laterally outer side of the girder 12 for operation in the manner described hereinbelow.

Again referring to FIGS. 14–17, the upper male lock will be described in detail, and it will be understood that the lower male lock is identical except for orientation. Connector member 96 is in the form of an elongate bolt having a shank 98 and a T-head 100 integrally formed at one end thereof. Head 100 has first and second transverse dimensions, perpendicular to each other. Although these dimensions are tapered from front-to-rear, as described below, they will, for convenience, be generally denoted "$H_1$" and "$H_2$", respectively. The first or longer dimension $H_1$ is everywhere substantially greater than the second $H_2$. The lateral surfaces of head 100 are inclined slightly toward each other from rear to front so that both the first and second transverse dimensions decrease from rear to front. However, the first or larger transverse dimension $H_1$ of head 100 is everywhere greater than the diameter of shank 98. The second or narrower transverse dimension $H_2$ of head 100 is equal to the diameter of shank 98 at its juncture therewith, decreasing forwardly therefrom.

Carrier member 94 is in the form of a rectangular parallelepiped having front face 105 and rear face 106. Carrier member 94 also has a carrier bore 102 extending therethrough from front to rear and in which connector member 96 is carried. Bore 102 has a cylindrical rear portion 102a and a rectangular forward portion 102b. Front portion 102b is sized and shaped like bore 90 of receiving member 20 so that it has first and second transverse dimensions perpendicular to each other, the first being greater than the second. The carrier member 94 of the upper male lock is oriented such that the first or greater transverse dimension of bore portion 102b lies horizontally, while the carrier member 94 of the lower male lock is oriented such that the first or greater transverse dimension of its forward bore portion 102b lies vertically, all as shown in FIG. 13.

The diameter of rear portion 102a is sized for a sliding fit on shank 98, and is equal to the second transverse dimension $P_2$ of receiving bore 90, and thus, to the corresponding dimension of portion 102b of carrier bore 102. Thus, both bores have a sliding fit on shank 98 throughout their length. The first transverse dimension $P_1$ of receiving bore 90 and the corresponding dimension of front portion 102b of carrier bore 102 may likewise be sized for a sliding fit on the rear portion of head 100, but in any event, are sized to permit head 100 to be received therein. Thus, dimension $P_1$ of receiving bore 90 is at least slightly greater than the first and longer transverse dimension $H_1$ of head 100, and dimension $P_2$ is greater than the second head dimension $H_2$ but less than $H_1$. Therefore, head 100 can pass through bore 90 only if $H_1$ lies parallel to $P_1$.

The portion of shank 98 which is disposed in bores 90 and 102 in use is smooth. The tail of shank 98 is threaded as indicated at 98a. Securing means in the form of a nut 104 threaded onto tail 98a is engageable with the rear face 106 of carrier member 94 to limit forward movement of connector member 96 with respect to carrier member 94.

As shown in FIG. 13, when girder 12 is viewed endwise, i.e. looking toward the front faces 86 and 105 of the locks, the two female locks are disposed on the lefthand arm 16, while the two male locks are disposed on the righthand arm. Also, as mentioned above, the upper female lock has its longer transverse bore dimension arranged horizontally, and the lower female lock has its longer transverse bore dimension arranged vertically, with the respective upper and lower male locks having the forward portions 102b of their carrier bores correspondingly oriented. Each end of each girder 12 has the same arrangement of primary locks, both in terms of the locations of male and female locks and the orientations of their bores.

Accordingly, if two girders are placed end-to-end, the forward face 86 of each receiving member of a female lock will abut the forward face 105 of the carrier member of a male lock, and the longer transverse dimension of the receiving bore will lie parallel to the longer transverse dimension of the forward portion 102b of the carrier bore. Then, if head 100 is positioned so that its greatest transverse dimension $H_1$ lies parallel to the first transverse dimension $P_1$ of the opposed bore 90, connector member 96 can be passed through receiving bore 90. The tapering of head 100 so that its transverse dimensions decrease from rear to front helps in guiding head 100 into bore 90. Then, head 100 can be rotated 90°, and shank 98 pulled slightly rearwardly with respect to carrier member 94 so that head 100 rests in recess means 92, which are sized to receive head 100 fairly snugly. Finally, nut 104 can be advanced along shank 98 so that it abuts the rear face 106 of carrier member 94. This prevents connector member 96 from moving forwardly with respect to carrier member 94, i.e. holds head 100 firmly in recesses 92. Thus, connector member 96 and nut 104 hold the receiving member 82 and carrier member 94 together, while the recesses 92 prevent head 100 from rotating to a position where it could slip through receiving bore 90. Because the second transverse dimension $P_2$ of receiving bore 90 is sized for a sliding fit on the outer diameter of shank 98, and bore 102 is correspondingly sized, shear loads between the two girders on which the locks are carried may be transmitted directly from either of members 82 or 94, through connector member 96, to the other of members 82 or 94 in at least one transverse direction (vertical in the case of upper locks).

Referring now to FIGS. 18–26, one of the transom components 28 and the auxiliary locking means associated therewith will be described in detail. The auxiliary locking means 24, 26 are generally similar to the primary locking means in form and principle of operation, but differ in detail.

The upper member 30 of each transom member 28 is T-shaped, having a horizontal head 30a and a base 30b extending vertically downwardly from head 30a. Similarly, lower member 32 is an inverted T-shaped member having a head 32a extending horizontally and a base 32b extending vertically upwardly therefrom. The end members 36 are in the form of webs interconnecting and forming continuations of the vertically-extending bases 30b and 32b.

Each end of transom member 28 carries four of the male locks 26. The locks are arranged in pairs, including a pair of upper male locks located on opposite sides of base 30b of upper transom member 30, and a pair of lower male locks located on opposite sides of base 32b of lower transom member 32.

Figure 12:
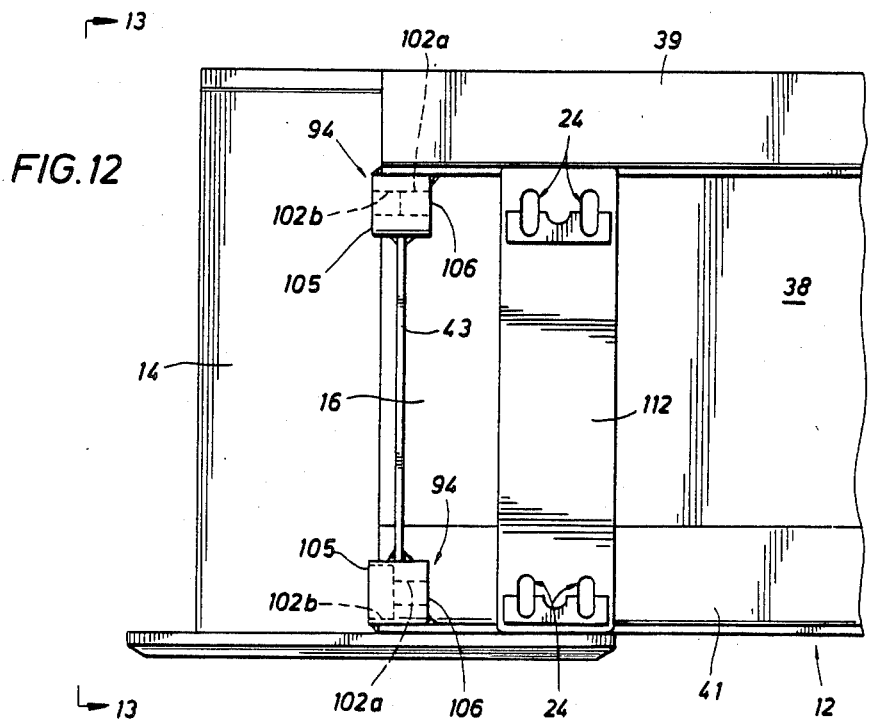
FIG. 12 is a side elevational view of one end of a longitudinal construction component showing the mounting of the locks.

Referring to FIGS. 12, 13 and 18, each lateral side of each girder 12 has a plurality of vertical webs 110 at locations spaced along the length of the girder. Each web 110 is welded between the laterally extending legs of the upper and lower angle members 39 and 41 on the respective side of the girder. Similarly, the female locks 24 are arranged in groups of vertically spaced pairs, each group including a pair of upper female locks 24 on opposite sides of one of the webs 110, and a pair of lower female locks on opposite sides of the same web 110 but spaced below the upper locks. A long, vertically oriented plate 112 is affixed, as by welding, to each of the webs 110 so that it extends across the outer edge of the web 112. Each such plate 112 forms a part of all four of the female locks 24 associated with the respective web 110. For purposes of the present description, the upper female locks 24 will be described, and it should be understood that the lower female locks 24 are identical both in form and orientation.

In addition to the common plate 112, each of the female locks further includes a respective second plate 114 affixed, as by welding, to the rear of plate 112. In addition, the upper female locks include a third plate 116 welded to the front of plate 112. The receiving member of each female lock includes its respective plate 114, along with the aligned portions of plates 112 and 116.

Figure 21:
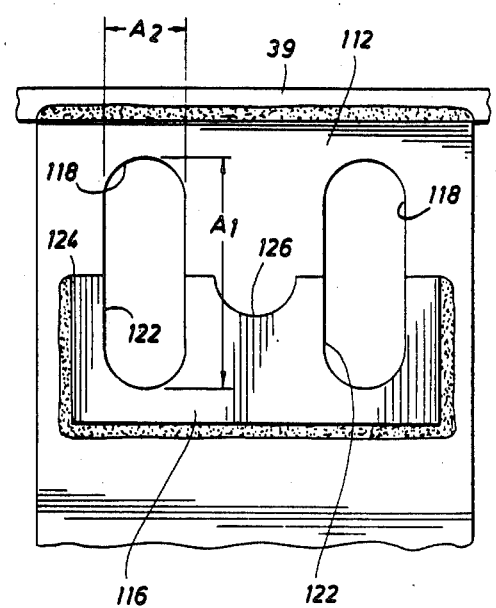
FIG. 21 is a front elevational view of a pair of auxiliary female locks taken on the line 21—21 of FIG. 17.
Figure 22:
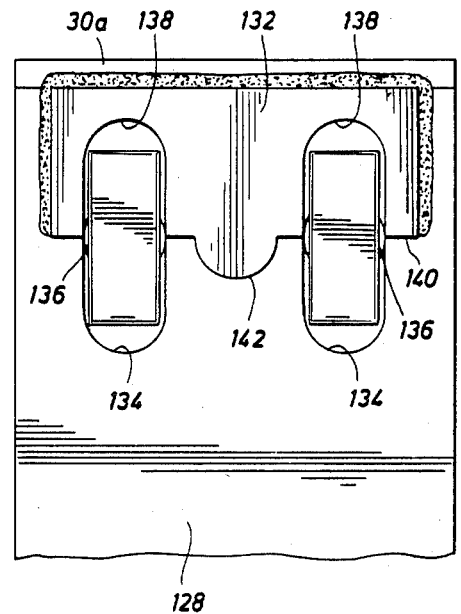
FIG. 22 is a front elevational view of a pair of auxiliary male locks taken on the line 22—22 of FIG. 19.
Figure 23:
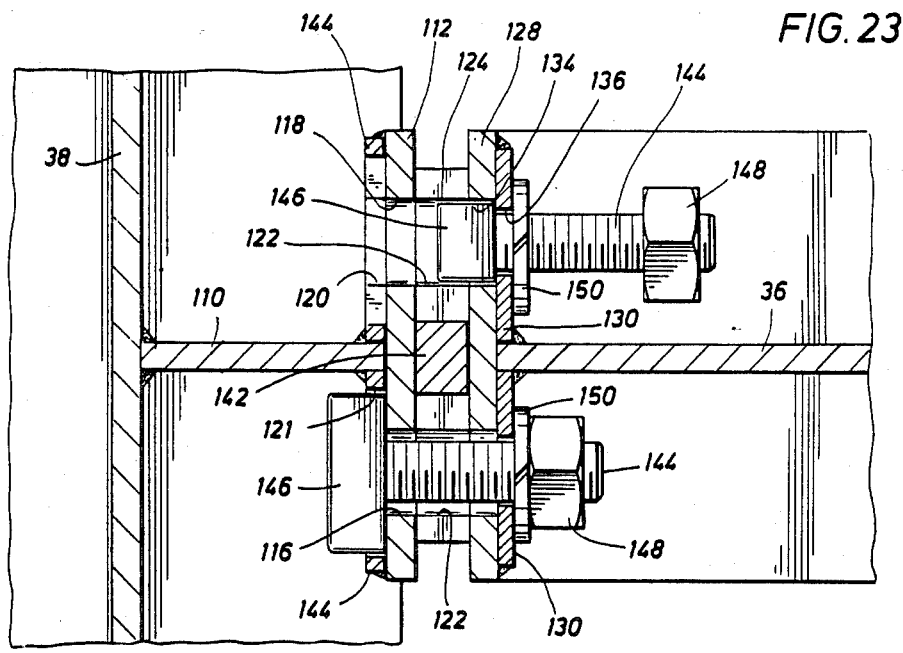
FIG. 23 is a longitudinal cross-sectional view through engaged auxiliary male and female locks taken on the line 23—23 of FIG. 20 but showing one connector advanced and locked and the other retracted.
Figure 24:
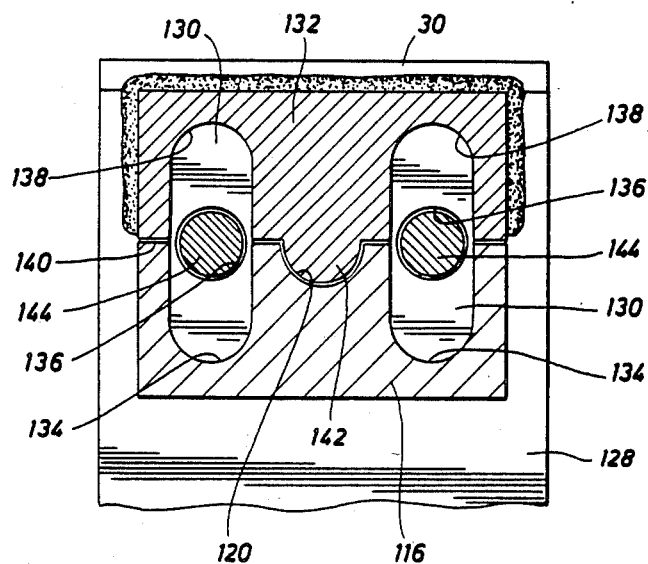
FIG. 24 is a transverse cross-sectional view through engaged male and female auxiliary locks taken on the line 24—24 of FIG. 20.
Figure 25:
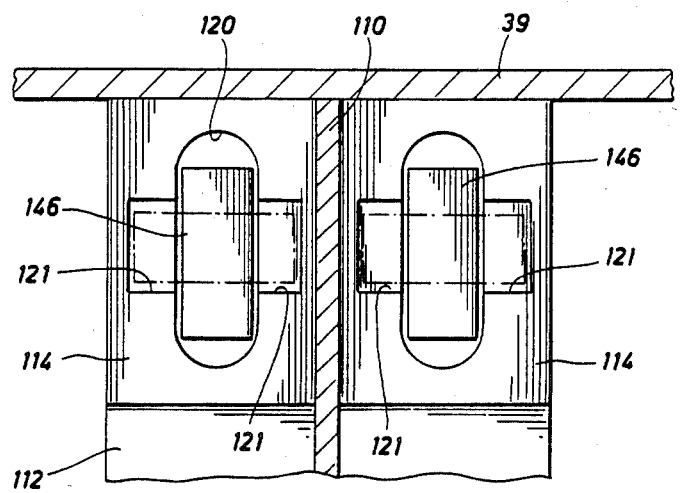
FIG. 25 is a transverse view of engaged male and female auxiliary locks taken from the rear of the female locks on the line 25—25 of FIG. 20.
Figure 26:
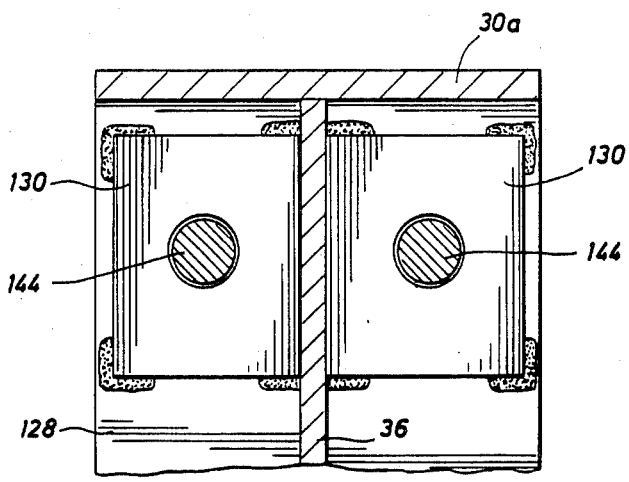
FIG. 26 is a transverse view of engaged male and female auxiliary locks taken from the rear of the male locks on the line 26—26 of FIG. 20.

Plates 112 and 114 have registering slots 118 and 120 opening therethrough in the front-to-rear direction. Slots 118 and 120 form the forward and rear portions, respectively, of the receiving bore of the female lock 24. As best shown in FIG. 21, the slots 118 and 120 have first and second transverse dimensions perpendicular to each other, the first such dimension or vertical height $A_1$ being substantially greater than the second such dimension or horizontal width $A_2$.

In addition to the rear portion 120 of the receiving bore, each plate 114 defines a pair of recesses 121 communicating with and extending laterally outwardly from slot 120 transverse to its height $A_1$ and further opening longitudinally rearwardly through the rear surface of plate 114.

Plate 116 serves as a forwardly projecting shear bearing formation in a manner to be described more fully hereinafter. Plate 116 is disposed in the vicinity of the lower halves of the slots 118 for the upper female locks. Plate 116 has a pair of notches 122 extending longitudinally therethrough, i.e. in the front-to-rear direction, and opening upwardly through the upper edge 124 of plate 116. Notches 122 correspond in configuration and register with the lower halves of respective slots 118. As shown in FIG. 21, upper edge 124 includes portions extending laterally outwardly from either side of each of the two openings 118 half way along their vertical height. Edge 124 also includes a shallow groove 126 between and spaced from its two notches 122.

A plate 128 is welded to each end of transom member 28 so that it extends between the heads 30a and 32a of the upper and lower members 30 and 32 as well as across the bases 30b and 32b and the intervening web 36. Plate 128 forms part of the carrier members of each of the four male lock assemblies 26 on each end of transom component 28, and again, only the upper locks will be described in detail.

As in the case of the female lock assemblies, each carrier member includes a respective plate 130 welded to the rear of plate 128. In addition, a plate 132 is welded to the front of plate 128 and forms a forwardly projecting shear bearing formation for both of the upper male locks. For each of the male locks, the plate 128 has a respective slot 134 therethrough similar to the slots 118 of the female locks in size, shape and orientation. Each plate 130 has a circular bore 136 aligned with the slot 134 of the respective male lock. The aligned slot 134 and bore 136 form the front and rear portions, respectively, of the carrier bore of the respective male lock. As best shown in FIG. 20, the diameter of each bore 136 is equal to the horizontal width of the registering slot 134.

Plate 132 lies generally in the vicinity of the upper halves of slots 134. Plate 132 has a pair of notches 138 extending longitudinally therethrough, corresponding in configuration to the upper halves of respective slots 134, lying in register therewith, and opening downwardly. The lower edge 140 of plate 132 forms a downwardly facing abutment surface having portions extending laterally outwardly from each of the slots 134 half way along their height. In addition, intermediate and spaced from the two notches 138, edge 140 has a downwardly projecting tab 142 configured to mate with groove 126 in plate 116 of the female locks.

Figure 17:
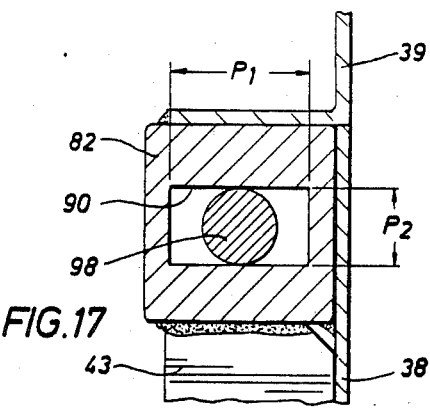
FIG. 17 is a transverse cross-sectional view taken on the line 17—17 of FIG. 15.

Each of the male locks 26 further comprises a connector member in the form of a T-head bolt having threaded shank 144 and T-head 146. Shank 144 is sized for a loose fit in bore 136. T-head 146 is sized to pass readily through slots 136, 118 and 120. The fit of head 146 in these slots is relatively loose, but is close enough so that head 146 can pass through the slots only if it is oriented with its longest transverse dimension extending vertically as shown in FIGS. 17 and 20.

A securing nut 148 is threaded to the shank 144, and a lock washer 150 is interposed between nut 148 and the rear surface of plate 130.

Thus, when the receiving bores 118, 120 of the upper female locks are in register with front portions 134 of the carrier bores of upper male locks 26, and head 146 is vertically oriented, it can be passed through the carrier and receiving bores, rotated 90°, and then drawn back in a reverse direction so that it is retained in recesses 121. Notches 122 and 138 permit such passage of head 146 through shear bearing plates 132 and 116. The front faces of each mated pair of male and female locks will be brought into firm abutment as each nut 148 is advanced on its respective shank 144 until it engages the respective lock washer 150. With the entire assembly thus tightly locked, surfaces 124 and 140 will be in abutment with each other, and will transfer vertical shear loads directly between the carrier and receiving members, without imposing such loads on the connector members 144, 146, the latter merely exerting a horizontal force to hold the male and female locks together. It should also be noted that, as the locks are being mated, tab 142 will mate with groove 126 to assist in the proper alignment of the carrier and receiving bores.

Referring now to FIGS. 1 and 2, an exemplary construction procedure in accord with the method of the present invention will be described. In particular, the exemplary construction procedure will be that of forming an elongate elevated platform in a shallow body of water.

A first span, shown in FIGS. 1 and 2, is formed by assembling construction components in accord with the present invention. This first span includes five of the elongate primary construction components 12, 14 arranged parallel, side by side, and laterally spaced apart. Components 12, 14 are connected in such relation by transom components 28. In particular, each transom component 28 may be lowered into the space between a pair of adjacent girders 12, but offset along the length of the girders 12 from the locus of the auxiliary female locks 24 to which it will be connected.

The transom member is lowered in this offset position until the lower male locks 26 have cleared the upper female locks 24, i.e. are disposed lower than such female locks. Then, the transom member may be moved lengthwise along the girders 12 until it is aligned with the female locks 24. Next, the transom member is further lowered and suitably guided until the lower edges 140 of plates 132 rest on the upper edges 124 of plates 116 with tabs 142 properly mated in grooves 126. The connector members 144, 146 are then passed through the receiving bores 118, 120 of the respective aligned receiving members of the female locks, are rotated 90°, and then retracted slightly so that their heads 146 fit into recesses 121. Bolts 148 are then tightened.

The first span may either be pre-assembled or assembled at the construction site. In any event, the span is positioned over the construction site, in this case floating on the body of water 152. Either before or after such positioning, the interlock members 68 are removed from their respective guide assemblies 14, and a piling 80 is lowered through the central throughway of each guide assembly 14. The first span is temporarily anchored in a proper orientation with respect to the bottom 154 of the body of water 152, by well known means (not shown) while pilings 80 are driven downwardly into load bearing relation with bottom 154. This may be done, for example, by suitable power hammer means either supported on the first span itself or on an adjacent platform or vessel. Decking (not shown in FIGS. 1 and 2) may be emplaced on the top of the first span to bridge gaps between the various construction components.

Next, the pilings 80 are cut off at their upper ends, if necessary, so that each extends upwardly by a distance corresponding to the intended height of the finished platform, and interlock members 68 are placed on the tops of respective pilings 80. Then, the first span is elevated on the support pilings 80 by use of jacks. Such jacks may be of any suitable form, and do not, per se, comprise a part of the present invention. However, to clarify the method of the present invention, a simplified form of jack is shown in FIGS. 10 and 11.

Each jack includes a hydraulic cylinder 156 within which is a piston having a piston rod 158 extending outwardly through the lower end of cylinder 156. The lower end of piston rod 158 is provided with a fitting 160 adapted to engage the central opening 72 of a respective one of the interlock members 68. Rigidly affixed to cylinder 156 is a support frame 162. Tie rods 164 are attached to frame 162 and extend downwardly through slots 50 in the upper wall of guide assembly 14. The lower ends of the tie rods 164 are connected to upper wall 42 as by enlarged T-heads 166 which engage the underside of wall 42.

Comparing FIGS. 10 and 11, it can be seen that, as the piston is reciprocated in cylinder 156 in such a direction as to extend rod 158, because rod 158 cannot move downwardly, cylinder 156 will move upwardly, carrying with it frame 162, rods 164 and guide assembly 14. To elevate the first span, a number of such jacks are operated simultaneously in association with respective ones of the guide assemblies 14, until the span has reached the desired height.

Preferably, pilings 80 are pre-cut to an appropriate length so that, when the first span has been elevated to the desired height, their upper edges lie generally flush with the upper surfaces of tongues 48. In any event, with pilings 80 adjusted to the appropriate height, and interlock members 68 in place on their upper ends, the interlock members 68, having been first positioned with their lugs 78 circumferentially offset from tongues 48 for passage therethrough, are rotated to bring lugs 78 into underlying relation to tongues 48. Thus, the interlock members 68 rest on their respective support pilings 80, and the guide assemblies 14 in turn rest on the interlock members 68, specifically their lugs 78, thereby supporting the first span on the pilings.

If decking 109 has not been previously emplaced on the first span, it is emplaced at this time. The structure is now ready for building out a second span from the first span.

The second span will be similar to the first span in that it will be comprised of five parallel longitudinal components interconnected by transom components. However, the primary construction components of the second span will differ from those of the first span in that they will have guide assemblies 14 at only one end of each girder 12'. Using a crane or the like (not shown) which may be supported on the first span, each girder 12' of the second span is positioned in end-to-end relation with a girder of the first span, and in particular, that end of the girder 12' which has no guide means therein is positioned adjacent one end of a girder of the first span so that its channel 18 may surround the portion of the guide assembly 14 protruding from the first girder and the end of the second girder and its arms 16 may rest on flange 66.

A worker standing on the first span may then operate the primary locking means to connect the second girder 12' to the first girder 12 in cantilever fashion. Because the upper female locks have the shorter transverse dimensions $P_2$ of their receiving bores 90 oriented vertically, and there is a sliding fit of $P_2$ on the diameter of shank 98, some vertical shear loading can be transmitted through connector members 96 of the upper locks. However, most of the vertical load is taken through flange 66 of guide assembly 14 to piling 80. The positioning of the lower female locks with the longer dimensions of their bores 90 lying vertically avoids the need for extremely precise spacing between the upper and lower locks.

All girders 12' of the second span are connected endwise to respective girders 12 of the first span in like manner, then to one another by transom components 25. Pilings 80 are then driven downwardly through the guide assemblies 14 distal the first span into load bearing relation with the floor 154 of the body of water 152. Then, utilizing interlock members 68 identical to those described hereinabove, the second girders 12' are interlocked, via guide assemblies 14, to the support pilings 80. When all of the second girders 12' have been emplaced and interconnected by transom members 28, decking 109 may be placed on top of the second span to bridge the gaps between the girders and/or transom components.

Figure 5:
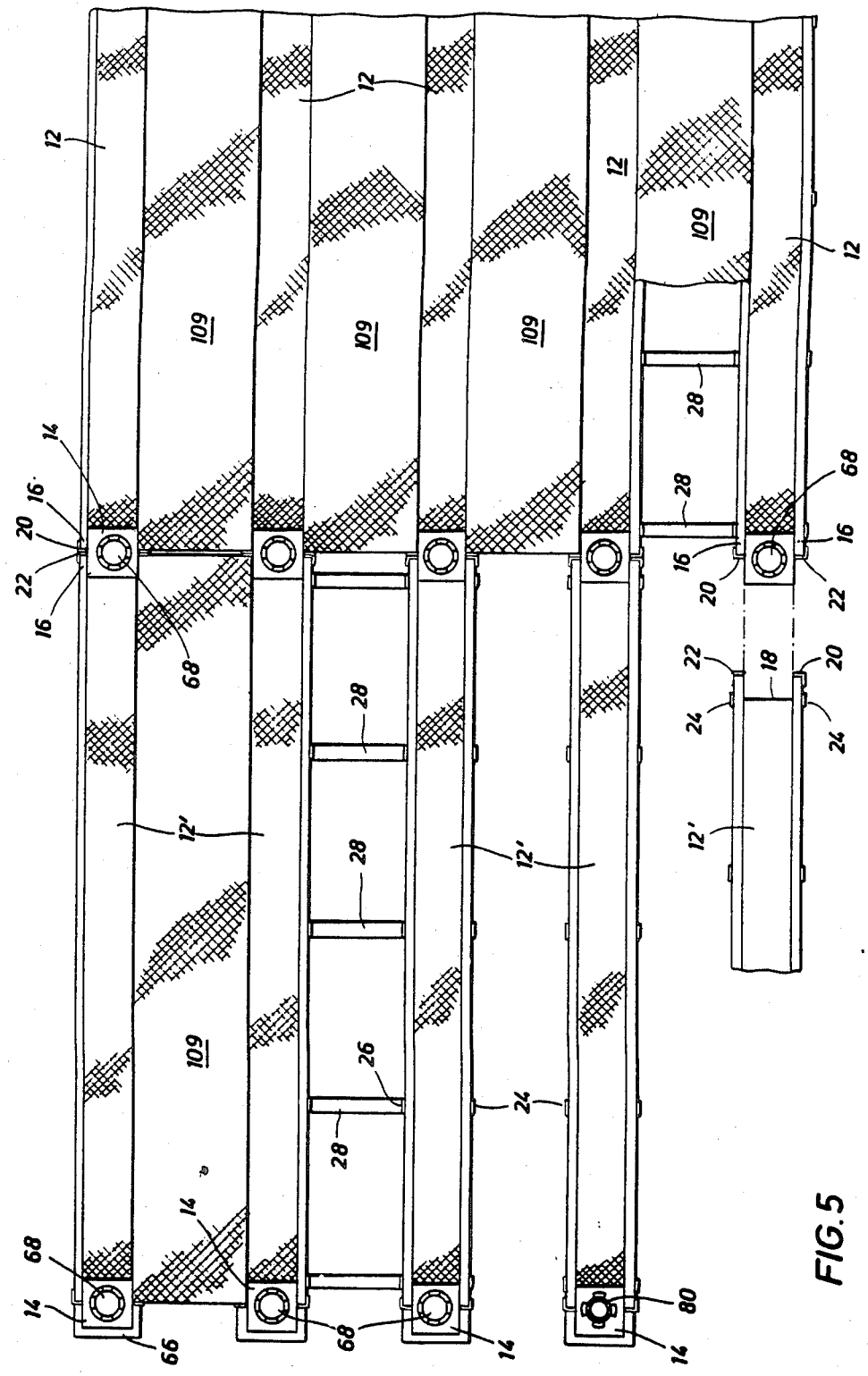
FIG. 5 is a top plan view taken on the line 5—5 of FIG. 4 in which, for convenience of illustration, various portions of the second span are shown in different stages of completion.
Figure 6:
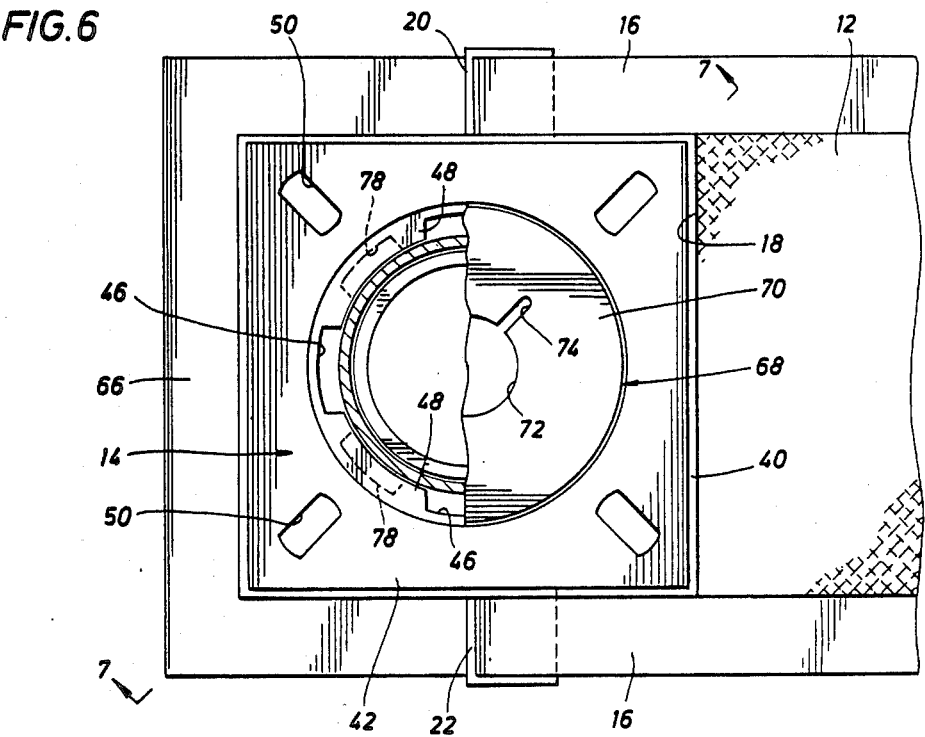
FIG. 6 is an enlarged top plan view, with parts broken away, of one end of one of the girders with its associated guide means.

The order of construction of the second span is preferably as just described. However, for convenience, FIG. 5 shows laterally adjacent portions of the second span in various stages of completion. Additional spans can be similarly added on to construct a platform of any desired length.

Disassembly and removal, when desired, can be accomplished, in essence, by reversing the steps outlined above. However, the pilings 80 would not ordinarily be completely removed from the underlying earth formation. Rather, a longitudinal construction component to be removed would be disengaged from its piling(s) by removal of interlock member(s) 68. The girder in question would be suitably supported, as by a crane or the like resting on a portion of the structure not yet being disassembled, and the primary locking means would be disengaged to free the longitudinal construction component. Because the abutting portions of the front faces of the carrier and receiving members are planar, i.e. include no overlapping vertical shear bearing formations, it is then possible to lift the longitudinal construction component vertically upwardly and out of engagement with piling(s) 80 by the aforementioned crane or the like.

Thus, the ability of the retractable connector members of the primary locks to transfer vertical shear loads between the carrier and receiving members is important in allowing the elimination of shear bearing formations from the last-mentioned members so that the components on which they are carried can be emplaced, and more importantly removed, by straight vertical movements, since lateral movements would be impossible after driving of the associated pilings 80. After a given longitudinal component has been thus removed, any piling or pilings previously associated therewith can be severed at an appropriate level, e.g. adjacent the surface of the underlying earth formation, or in some cases, may simply be left in place.

It will be appreciated that the method may be varied somewhat depending upon the type of structure being formed and the type of earth formation underlying that structure. For example, in some cases, it is not necessary to elevate the first span before adding the second span. In other cases, the entire first span need not be supported on pilings. For example, in constructing a bridge, one end of the first span may rest directly on a bank (and be suitably anchored thereto), and the distal end, below which the bank slopes down toward the body of water, can be supported on pilings, and a second span built out therefrom.

It is particularly noted that the structure can be extended laterally in an incremental fashion using basically the same method as is used for the incremental longitudinal building of the structure, i.e. by supporting a first construction component on the underlying earth formation, locking a second component to the first component in cantilever fashion, extending support means downwardly from the second component into load bearing engagement with the earth formation, and finally interlocking the second component to its support means for support thereby. However, due to the fact that the lateral connections between girders 12 are adapted to be made via the transom members 28, the step of locking the second component to the first in cantilever fashion will preferably be accomplished by first locking two or more transom components to the first component and then locking the second girder in turn to the transom components. Such a modification might be used, for example, where an elongate structure such as a bridge is being built out lengthwise according to the present invention, and at selected points along its length, widened areas are desired, e.g. to serve as pull-out points for vehicles which must, for one reason or another, stop on the bridge. Such modification might also be employed where a structure of irregular configuration is desired for some other reason.

Still other variations will suggest themselves to those of skill in the art. Accordingly, it is intended that the scope of the present invention be limited only by the claims which follow.

What is claimed is:

1. A construction system comprising:
    a plurality of longitudinal construction components each comprising a girder, said girders having primary locking means on their ends for locking said girders together in end-to-end relation;
    some of said primary locking means being primary male locks each of which comprises—
        an elongate connector member having a shank and a head rigidly carried on one end of said shank, said head having first and second transverse dimensions measured in perpendicular directions, said first transverse dimension being substantially greater than said second transverse dimension and further being substantially greater than the transverse dimension of said shank measured parallel to said first transverse dimension,
        a carrier member rigidly adjoined to such end of one of said girders and having a front face facing outwardly endwise of said one girder, a rear face at the opposite end from said front face, and a carrier bore extending therethrough from front to rear and receiving said connector member for longitudinal reciprocation, and
        securing means selectively interengageable between said connector member and said carrier member to limit forward movement of said connector member with respect to said carrier member;
    and others of said primary locking means being primary female locks each of which comprises—
        a receiving member rigidly adjoined to such end of another of said girders and having a front face facing outwardly endwise of said other girder, a rear face at the opposite end from said front face, and a receiving bore extending there-through from front to rear, said receiving bore having first and second transverse dimensions measured in perpendicular directions, said first transverse dimension of said receiving bore being greater than said first transverse dimension of said head, and said second transverse dimension of said receiving bore being greater than said second transverse dimension of said head but less than said first transverse dimension of said head.

2. The apparatus of claim 1 wherein as to each of said receiving members said rear face has recess means extending longitudinally thereinto communicating with and extending outwardly from said receiving bore parallel to said second transverse dimension, said recess means being adapted to at least partially closely receive said head of said connector member when said first transverse dimension of said head is arranged parallel to said second transverse dimension of said receiving bore.

3. The apparatus of claim 1 wherein each of said girders has a plurality of auxiliary locking means along its lateral sides;
    and wherein said system further comprises a plurality of transom construction components having auxiliary locking means on their ends for cooperation with said auxiliary locking means on said girders.

4. The apparatus of claim 3 wherein some of said auxiliary locking means are auxiliary male locks comprising such connector members, carrier members, and securing means, and others of said auxiliary locking means are auxiliary female locks comprising such receiving members.

5. The apparatus of claim 4 wherein said auxiliary locking means on said girders are such auxiliary female locks and said auxiliary locking means on said transom members are such auxiliary male locks.

6. The apparatus of claim 5 wherein each end of each of said girders has such primary locks of one gender on the righthand side and such primary locks of the other gender on the lefthand side.

7. The apparatus of claim 4 wherein, as to each of said primary male locks, said shank is generally cylindrical with a diameter greater than or equal to said second transverse dimension of said head; and
    wherein, as to each of said primary female locks, said second transverse dimension of at least a portion of said receiving bore is sized for a sliding fit on such shank.

8. The apparatus of claim 7 wherein, as to each of said primary male locks, at least a portion of said carrier bore is sized for a sliding fit on said shank.

9. The apparatus of claim 8 wherein said front faces of said carrier and receiving members have respective abutment portions configured to be engageable with each other without overlapping in the vertical direction.

10. The apparatus of claim 8 wherein said portion of said carrier bore is cylindrical and is disposed adjacent said rear face of said carrier member; and
wherein said carrier bore has a front portion adjacent said front face of said carrier member configured to receive said head.

11. The apparatus of claim 10 wherein, as to each of said male locks, said shank of said connector member has a threaded tail; and
wherein each of said securing means comprises a nut threadedly engaged with said tail and having one end opposed to said rear face of said carrier member.

12. The apparatus of claim 8 wherein,
as to each of said auxiliary male locks, said front face of said carrier member has a forwardly projecting shear bearing formation thereon, said shear bearing formation having an abutment surface facing transverse to said carrier bore; and
as to each of said auxiliary female locks, said front face of said receiving member has a forwardly projecting shear bearing formation thereon, said shear bearing formation having an abutment surface facing transverse to said receiving bore and engageable with such abutment surface of one of said carrier members if said front face of said receiving member is placed in abutment with said front face of said one carrier member and the respective shank is disposed generally in both said carrier and receiving bores.

13. The apparatus of claim 4 wherein,
as to each of said auxiliary male locks, said front face of said carrier member has a forwardly projecting shear bearing formation thereon, said shear bearing formation having an abutment surface facing transverse to said carrier bore; and
as to each of said auxiliary female locks, said front face of said receiving member has a forwardly projecting shear bearing formation thereon, said shear bearing formation having an abutment surface facing transverse to said receiving bore and engageable with such abutment surface of one of said carrier members if said front face of said receiving member is placed in abutment with said front face of said one carrier member and the respective shank is disposed generally in both said carrier and receiving bores.

14. The apparatus of claim 13 wherein said abutment surfaces extend laterally from their respective carrier or receiving bores.

15. The apparatus of claim 14 wherein each of said abutment surfaces has portions disposed on diametrically opposite sides of the respective bore, said abutment surface further having a notch therein between said portions in register with the respective bore.

16. The apparatus of claim 15 wherein said abutment surfaces have matable indexing formations for aligning said receiving bores with said carrier bores.

17. The apparatus of claim 4 further comprising a plurality of guide means each defining a throughway for receipt of an elongate support member, and each rigidly affixed to one end of a respective one of said girders with the length of said throughway disposed transverse to the length of said girder as well as to the lateral side-to-side width of said girder.

18. The apparatus of claim 17 further comprising a plurality of interlock means each associated with a respective one of said guide means and, when said throughway is generally vertically oriented and such support member is in said throughway, interengageable between said guide means and such support member to allow said guide means to be supported on such support member.

19. The apparatus of claim 17 wherein each end of each of said girders has a channel opening outwardly endwise of said girder, and each of said guide means is disposed in the channel of the respective girder end to which it is so affixed.

20. The apparatus of claim 19 wherein each of said channels is at least partially defined by a pair of arms extending longitudinally outwardly on opposite lateral sides of said girder, and as to each of those girder ends so affixed to a respective one of said guide means, said arms extend approximately half way across the respective guide means whereby the other half of said guide means protrudes endwise from said girder.

21. The apparatus of claim 20 wherein at least some of said primary locking means are disposed on the outer ends of said arms.

22. The apparatus of claim 21 wherein each of said guide means has flange means underlying the affixed girder end and extending at least partially along the half of said guide means so protruding from said girder.

23. The apparatus of claim 22 wherein, as to each of said primary male locks, said shank is generally cylindrical with a diameter greater than or equal to said second transverse dimension of said head;
wherein, as to each of said primary female locks, said second transverse dimension of at least a portion of said receiving bore is sized for a sliding fit on such shank;
wherein, as to each of said primary male locks, at least a portion of said carrier bore is sized for a sliding fit on said shank; and
wherein each of said girder arms has two of said primary locks of the same gender spaced vertically from each other, and as to each such arm carrying female locks, the receiving bore of the uppermost female lock has its first transverse dimension disposed generally horizontally, and the receiving bore of the lowermost female lock has its first transverse dimension disposed generally vertically.

* * * * *

UNITED STATES PATENT AND TRADEMARK OFFICE
CERTIFICATE OF CORRECTION

PATENT NO. : 4,687,379

DATED : August 18, 1987

INVENTOR(S) : Alces P. Robishaw

It is certified that error appears in the above-identified patent and that said Letters Patent is hereby corrected as shown below:

Title Page:

In Column 1, line (22), delete "Feb. 9, 1986" and insert therefor --September 2, 1986--.

Signed and Sealed this

Twenty-fourth Day of May, 1988

Attest:

DONALD J. QUIGG

Attesting Officer

Commissioner of Patents and Trademarks